F. EMMENEGGER.
SPOON.
APPLICATION FILED SEPT. 17, 1909.
1,044,869.
Patented Nov. 19, 1912.
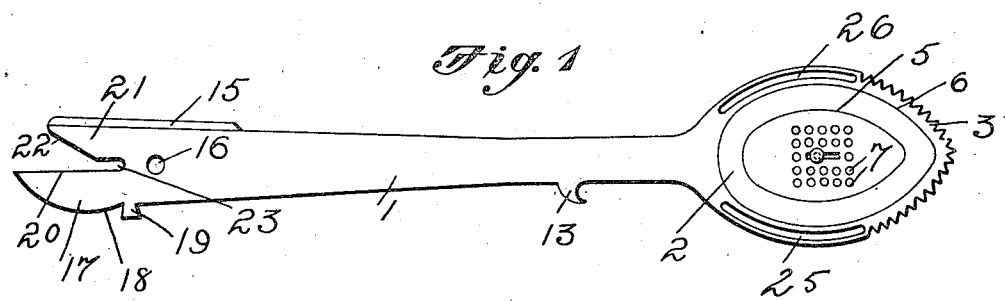
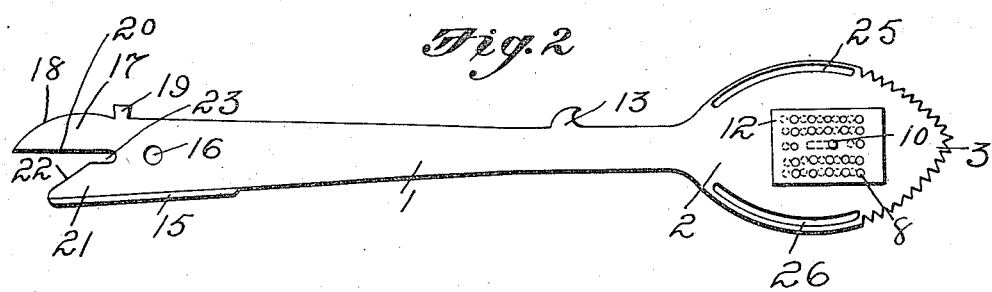
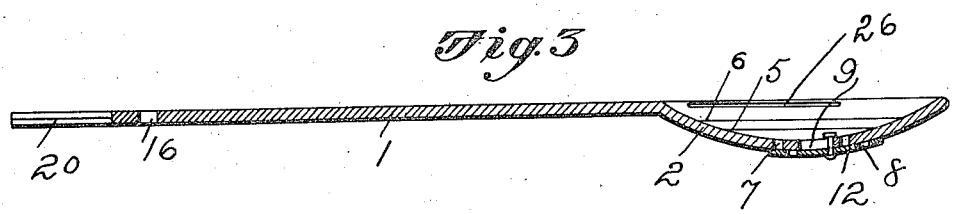
WITNESSES
INVENTOR
Frank Emmenegger
By Woodward & Chandler
Attorney

UNITED STATES PATENT OFFICE.

FRANK EMMENEGGER, OF ST. LOUIS, MISSOURI.

SPOON.

1,044,869.  Specification of Letters Patent.  Patented Nov. 19, 1912.

Application filed September 17, 1909.  Serial No. 518,202.

*To all whom it may concern:*

Be it known that I, FRANK EMMENEGGER, a citizen of the United States, residing at St. Louis, State of Missouri, have invented certain new and useful Improvements in Spoons, of which the following is a specification.

My invention relates to certain new and useful improvements in spoons, and it consists in the novel combination and arrangement of parts as will be hereinafter more particularly described and claimed.

In the drawings forming a portion of this specification, and in which like numerals of reference indicate similar parts in the several views: Figure 1 is a top view of a spoon embodying my invention, Fig. 2 shows a bottom view of the spoon, Fig. 3 shows a longitudinal sectional view.

Kitchen spoons, especially those of the larger size arranged for ladle purposes and the like, are usually constructed to serve but one purpose. In my invention, the purpose is to provide a spoon that can be used for various other purposes.

The handle 1 of the spoon is preferably flat and is provided at one end with the bowl 2. The opposite edges near the point 3 of the spoon are serrated as is shown in Fig. 1 so that the spoon may be used as a pie crimper. The bowl of the spoon is further provided with the upwardly directed oval ridges 5 and 6 which mark the capacity of an ordinary dessert and table spoon respectively, these demarcations being used where quantities are to be measured out according to different formulas.

The bottom of the bowl 2 of the spoon is provided with a series of perforations 7 and also an elongated opening 9, and slidingly located below the said openings and slots is secured a shield or plate 12 having registering openings 8, which correspond in arrangement and size to the openings 7 formed in the bowl of the spoon. The sliding plate or shield 12 is slidingly secured to the bowl of the spoon by a pin 10 carried by said shield and passing through the slot 9 formed in said bowl. By this construction the bowl of the spoon may be used as a strainer when desired by moving the plate or shield 12 to a position to cause the openings 8 thereof to register with said openings 7 of the spoon, the latter being closed when the said shield is moved in position as shown in Fig. 3 of the drawings, when it is desired to use the spoon in the usual way.

Formed in the bowl 2 of the spoon adjacent to its opposite curved edges are two concentric curved slots 25 and 26, one end of which terminates adjacent to the serrated end 3 of the spoon, which slots, together with the perforations 7, form a very practical and effective egg beater when the device is desired to be used for such a purpose.

The handle 1 of the spoon is further provided along one edge with the laterally extending hook 13 the point of which extends in the direction of the bowl and is arranged to serve as a suspending means by means of which the spoon may be hooked to a suitable vessel. This hook further serves an additional function in that the same is of such a size that the end of the hook can be brought below those metallic caps usually employed in closing certain classes of bottles.

As clearly disclosed in Figs. 1 and 2, the edge of the spoon opposite to the hook 13 is provided near the end of the handle with the cutting edge 15, this cutting edge being a blunt edge arranged to serve as a butter or cake knife, the handle being flat as has been described. The handle at its end is further provided with the aperture 16 by means of which the spoon may also be suspended.

The end of the handle 1 is in the form of a knife 17 serving as a can opener having the rounded edge 18 ending in the heel 19 serving as a fulcrum and also preventing the blade 17 going too deep into the can when the spoon is used as a can opener. The cutting edge 20 of the can-opening blade 17 extends approximately in alinement with the line centrally bisecting the handle 1. The opposite side 21 of the handle end has the oblique face or edge 22 from which is continued the slot 23 serving as a tack puller.

The spoon above described excepting the pin and the shield may be formed entire in one operation in being stamped from sheet metal, the attachments of the shield later being effected in any suitable workmanlike manner.

The spoon is simple and inexpensive in construction and both durable and efficient in operation.

What is claimed is:

In a spoon, the combination with a handle, of a bowl formed on one end thereof, said bowl having a longitudinally extending slot formed centrally therein and having a plurality of apertures formed in its central portion surrounding the said slot, a pin having a head resting against the inner face of the bowl and having its shank passing downward through the slot in the bowl, and a plate secured on the lower end of the pin and shaped to conform to the curvature of the under surface of the bowl and to fit tightly thereagainst, said plate having apertures formed therein corresponding in number and arrangement to the apertures in the bowl, whereby the plate may be slid to cause the apertures thereof to lie in alinement with the apertures of the bowl or may be moved with the pin riding in the slot as a guide to cause the apertures of the plate to lie out of alinement with the apertures of the spoon bowl to prevent escapement of the contents of the bowl.

In testimony whereof I affix my signature, in presence of two witnesses.

FRANK EMMENEGGER.

Witnesses:
 LOUIS SCHAUM,
 FRANK C. EMENEGER.